United States Patent
Usui

[11] Patent Number: 6,165,381
[45] Date of Patent: Dec. 26, 2000

[54] VISCOUS LIQUID DEOXIDIZER, DEOXIDIZING SHEET MADE THEREOF AND MANUFACTURING METHOD FOR DEOXIDIZING SHEET

[75] Inventor: Akio Usui, Tochigi, Japan

[73] Assignee: Kabushiki Kaisha Genchi Kenkyusho, Tochigi Pref., Japan

[21] Appl. No.: 08/937,790

[22] Filed: Sep. 24, 1997

[51] Int. Cl.[7] .............................. B01J 20/04; B01J 20/20; B01J 20/26

[52] U.S. Cl. ................. 252/188.28; 106/287.17; 252/184; 252/397; 252/400.1; 252/400.52; 252/400.53; 428/35.3; 426/124

[58] Field of Search ................. 106/287.17; 426/124; 428/35.3; 252/188.28, 184, 397, 400.1, 400.52, 400.53

[56] References Cited

U.S. PATENT DOCUMENTS

| | | | |
|---|---|---|---|
| 4,299,719 | 11/1981 | Aoki et al. ........................... | 252/188 |
| 4,856,650 | 8/1989 | Inoue ................................... | 206/204 |
| 5,262,375 | 11/1993 | McKedy ............................... | 502/406 |
| 5,746,937 | 5/1998 | McKedy et al. ................. | 252/188.28 |
| 5,849,380 | 12/1998 | Kashiba et al. ...................... | 428/36.6 |
| 5,919,521 | 7/1999 | Memula ............................... | 427/244 |

OTHER PUBLICATIONS

Hackh's Chemical Dictionary, 4th ed., p. 605, 1969.

*Primary Examiner*—Ellis Robinson
*Assistant Examiner*—Sandra M. Nolan
*Attorney, Agent, or Firm*—Ronald E. Greigg; Edwin E. Greigg

[57] ABSTRACT

A viscous liquid deoxidizer including a metal powder, a water absorptive polymer and/or a tackifier and water as an essential component, where the metal powder is a reacting component and the deoxidizer is formed in the form of a viscous liquid. It also relates to a deoxidizing sheet using this deoxidizer and a method for producing such deoxidizing sheet.

5 Claims, 1 Drawing Sheet

VISCOUS LIQUID DEOXIDIZER, DEOXIDIZING SHEET MADE THEREOF AND MANUFACTURING METHOD FOR DEOXIDIZING SHEET

BACKGROUND OF THE INVENTION (1) Field of the Invention

The present invention relates to a viscous liquid deoxidizer, a deoxidizing sheet using the viscous liquid deoxidizer and a method for producing the deoxidizing sheet. The invention makes it possible to noticeably retard undesired oxidation reaction during production, to perform the placement of the deoxidizer in a predetermined shape on a substrate at high rate of speed by printing, painting or the like, to both easily and economically produce a thin deoxidizing sheet, and to efficiently, evenly and uniformly absorb oxygen present in the air. Since the invention relates to the thin sheet of deoxidizer, it prevents an end consumer from mistakenly swallowing the deoxidizing sheet.

(2) Description of the Related Art

When storing foods, prevention of degradation or decoloration due to oxidation reaction caused by oxygen in the air as well as of deterioration due to decomposition by aerobes is an important consideration.

In particular, when fats and oils become oxidized, it not only spoils taste and flavor of the food but may cause food poisoning due to toxicity of the oxide. The oxidation of fats and oils is promoted by oxygen, light, metal ions, heat, water content, etc. The oxidation proceeds gradually at first, but it starts proceeding rapidly after a certain period of time. Particularly, if the fats and oils include unsaturated bonds, they become oxidized to produce harmful substances such as peroxide, aldehyde, ketone, acid or the like.

In order to solve the above-mentioned problems, the following were proposed as a method for storing foods using a deoxidizer.

A first method involves production of a powdery deoxidizer by mixing a metal powder and water or the like at the optimum condition so that oxygen absorption is at the maximum level. The powdery deoxidizer thus produced is filled and sealed in a pouch made of a porous material, and the pouch containing the power deoxidizer is then placed and sealed in a non-gas-permeable container or bag together with foods (Japanese Laid-Open Patent Publication No. 62-54704).

Generally, this oxidizing pouch is produced as follows. First, the powdery deoxidizer including water content is dropped onto a predetermined region of a substrate, and then a cover made of a gas-permeable material is placed thereon. Then, the substrate and the cover are heat-sealed along the periphery so that the powdery deoxidizer is sealed inside.

The deoxidizing pouch thus produced is kept in an air-tight bag for storage or for distribution so as to prevent oxidation reaction until it is put to use.

A second method involves a deoxidizing sheet produced as follows. First, an adhesive agent is applied onto a surface of an unwoven fabric having a thickness of about 0.1 mm, and a deoxidizer having a grain size of about 100 meshes (metal powder processed by diluted hydrochloric acid) is dispersed thereon. Then, another unwoven fabric also having an adhesive agent applied on its surface is placed onto the previous unwoven fabric in such a manner that the surfaces having the adhesive agent face each other. The two unwoven fabrics are pressed so that they stick together to form a deoxidizing layer. Next, a composite film made of a nylon film (thickness: 25 $\mu$m) and a polyethylene film (thickness: 40 $\mu$m) is placed on the upper surface of the deoxidizing layer, and a polyethylene film provided with micro pores is placed on the bottom surface of the deoxidizing layer. Next, two of the oxidizing layers prepared as above are placed adjacent each other in such a manner that the porous polyethylene films are inside, and they are heat-sealed on three sides so as to form a pouch. Then, absorbent cotton containing water is placed in the pouch, and the opening is heat-sealed for air-tightness (Japanese Laid-Open Patent Publication No. 55-106519).

A third method involves mixing a deoxidizer having a grain size of about 1 to 50 $\mu$m in a resin and then drawing the mixture of the resin so that it becomes porous (Japanese Laid-Open Patent Publication No. 2-229840).

Finally, a fourth method involves an oxygen absorbing sheet produced as follows. A resin composition made of 15 to 70% by weight of a thermoplastic resin and 30 to 85% by weight of an iron-based oxygen absorber is fabricated into an oxygen absorbing sheet having a thickness of 30 $\mu$m to 5 mm, which is then drawn at least mono-directionally with a draw factor of 1.5 to 8. Then, a resin layer having an oxygen permeation rate of 10,000 cc/m$^2$day or more at 23° C. is disposed either on one side or on both sides of this sheet (Japanese Laid-Open Patent Publication No. 5-318675).

The first method described above, where the deoxidizer takes a powder form, presents the following problems. First, the powder tends to disperse during production of the deoxidizer or the deoxidizing sheet, which degrades the work environment. Secondly, since the deoxidizer is in a powder form, it has a large surface area and its contact with the air is amply made. Therefore, oxidation reaction with the air undesirably proceeds when mixing ingredients for the deoxidizer or during the process where the deoxidizer is being placed onto the substrate. This results in both a loss of deoxidizing capability and deterioration of the quality of the deoxidizer. And, thirdly, coagulation of the oxidation product presents many difficulties such as an irregularity in drop amount of the deoxidizer onto the substrate, poor handling, complication of maintenance of production facilities, limitations imposed both on the operating hours for production facilities and the working hours for workers, and difficulties associated with the processing of the resulting coagulants.

Moreover, as described above, if the deoxidizer is in a powdery form, the undesired oxidation reaction with the air occurs during a time period between the production of the deoxidizing sheet and the packing of the deoxidizing sheet in an air-tight bag. This deteriorates the quality of the deoxidizing sheet and decreases its reliability.

In order to prevent such undesired oxidation reaction of the deoxidizer, modification can be made such that the mixing machine is structured to be air-tight and the air inside the mixing machine is replaced with nitrogen. The ingredients for the deoxidizer are then mixed uniformly. However, this makes the structure of mixing machine complex, and the mixing machine becomes expensive, resulting in high prices for the deoxidizer or deoxidizing sheet.

Moreover, since the powdery deoxidizer has poor packability, irregularities in packing amount or uneven distribution of the deoxidizer results. Therefore, the powdery deoxidizer is not suited for the production of deoxidizing sheet.

The second method is preferable in that it can uniformly distribute the deoxidizer. However, there still remain some problems as described below.

First of all, since the second method also uses the powdery deoxidizer, it has similar problems as the first method.

Moreover, since particles of the powdery deoxidizer are fixed by an adhesive agent, contact with the air is largely blocked by the adhesive agent. As a result, a desired deoxidizing effect is obtained less easily, which results in a decrease in reliability, non-uniformity in product quality, unpracticality of the product, etc. Any of these can be considered as a critical defect.

In other words, it is extremely difficult to uniformly distribute the particles of powdery deoxidizer on the surface of an adhesive agent in such a manner that the state of exposure of the particles to the air is uniform. If this is to be achieved, the production steps inevitably become complicated, thereby resulting in low productivity and extremely high production cost.

The third method described above involves mixing a deoxidizer having a particle diameter of about 1 to 50 $\mu$m in a resin and then drawing the mixture of the deoxidizer and the resin so as to make the mixture porous. However, portions of the mixture which become porous by drawing are not necessarily where the deoxidizer is present. Therefore, a part of the deoxidizer is either partially or totally buried in the resin, resulting in the extremely poor contact with the air. Consequently, as in the case of the second method described above, a desired deoxidizing effect is obtained less easily, which results in a decrease in reliability, non-uniformity of product quality, unpracticality of the product, etc. Any of these can be considered as a critical defect.

The fourth method described above involves an oxygen absorbing sheet produced as follows. A resin composition made of 15 to 70% by weight of a thermoplastic resin and 30 to 85% by weight of an iron-based deoxidizer is fabricated into a sheet having a thickness of 30 $\mu$m to 5 mm, which is then drawn at least mono-directionally with a draw factor of 1.5 to 8 (hereinafter referred to as sheet A). Then, a resin layer having an oxygen permeation rate of 10,000 cc/m$^2$day at 23° C. (hereinafter referred to as layer B) is disposed either on one side or on both sides of sheet A. As in the third method, portions of the sheet which become porous by drawing are not necessarily where the deoxidizer is present. Therefore, a part of the deoxidizer is either partially or totally buried in the resin, resulting in the extremely poor contact with the air. Consequently, as in the case of the second method described above, a desired deoxidizing effect is obtained less easily, which results in a decrease in reliability, non-uniformity of product quality, unpracticality of the product, etc. Any of these can be considered as a critical defect.

In the above method, sheet A is disposed on layer B by thermal adhesion or by having a glue layer between the two. Also proposed is a method where sheet A and layer B are laminated by co-extrusion or lamination before drawing, and then the two are drawn together. However, since pores in sheet A are blocked by layer B when laminated on sheet A, the contact between the deoxidizer and the air becomes worse.

SUMMARY OF THE INVENTION

In order to solve the above-described technical problems, the present inventor has made intensive studies on a deoxidizer and a deoxidizing sheet, which make it possible: to prevent a loss of deoxidizing capability due to undesired oxidation reaction during production and resulting deterioration of the quality of deoxidizer by inhibiting the oxidation reaction of the deoxidizer; to prevent difficulties associated with the coagulation of deoxidizer by inhibiting the coagulation; to produce a thin deoxidizing sheet at a high rate of production; and to prevent the shifting of the deoxidizer or its uneven distribution within a pouch by uniformly distributing and then fixing it, so that the deoxidizing reaction (oxidation reaction) by the deoxidizer is uniformly carried out.

The studies show that the principle of deoxidization by a deoxidizer of the kind presented in the present specification is the oxidation reaction of metal powder with oxygen in the air. They also show that the amount of water content has particularly a large influence on a reaction rate in the deoxidization reaction (oxidation reaction).

Specifically, if it contains a large amount of water content, then the oxidation reaction is considerably retarded. If the reaction is to be prompted, it is necessary to have a certain moisture. If a certain moisture is present, then the supply of air (oxygen) to the metal powder is appropriately done and the oxidation reaction proceeds smoothly.

However, if the water content is too large, the water acts as a barrier layer and the supply of air to the metal powder decreases, thereby considerably retarding the oxidation reaction.

Regarding the above-mentioned findings, the present inventor has made intensive studies on a relatively stable deoxidizer when exposed in the air.

Consequently, it was found that if a deoxidizer is made in the form of a viscous liquid including a metal powder, a tackifier and water as the essential components where the metal powder is a reacting component, then the metal powder becomes coated with water or a gel which absorbed water. This cuts down the air supply to the deoxidizer. Furthermore, since the deoxidizer is not in the form of a powder but in the form of a viscous liquid, the surface area of the deoxidizer is considerably small, and this also cuts down the air supply to the deoxidizer. As a result, the oxidation reaction between the deoxidizer and the air is greatly suppressed and the stability of the deoxidizer in the air is obtained.

Moreover, it was found that if the deoxidizer is made in the form of a viscous liquid, then transfer of the deoxidizer to another supporting medium is easily done by printing or coating such as screen printing. Furthermore, as described above, since the supply of air is decreased and the oxidation reaction is practically stopped, a loss of deoxidizing capability of the deoxidizer and deterioration of the quality due to undesired oxidation reaction during production are prevented. Various difficulties associated with the coagulation of deoxidizer are also prevented, and a uniform oxidation reaction proceeds for the entire surface of the deoxidizer of the deoxidizing sheet.

It was also found that if a viscous liquid deoxidizer is used instead of a powdery deoxidizer, transfer or lamination by printing or coating such as screen printing is easily done as described above, and the deoxidizer can be uniformly distributed and then fixed in a pouch. Furthermore, if a viscous liquid deoxidizer is transferred or laminated on a foamed film sheet, a sheet of paper for household use such as tissue paper, paper towel, etc., a piece of thick paper such as cardboard, corrugating medium in the cardboard, etc., an unwoven or woven fabric or a porous film sheet, or on a water absorptive layer which is formed on any of the above, then all of or a part of the viscous liquid deoxidizer is fixed thereon, thereby preventing the deoxidizer from changing its distribution.

In addition, since the viscous liquid deoxidizer does not contain an air layer because there is no spaces inside, and since an excess water layer and the gel containing water cover the surface of the particles of metal powder as a barrier layer, the deoxidization reaction (oxidation reaction) is considerably suppressed.

However, if the viscous liquid deoxidizer is transferred or laminated on a substrate and is covered with a covering material, a part of water or water contained in the gel which is covering the surface of particles of metal layer as a barrier layer, is absorbed by a pouch material (either the substrate or the coating material or both). This eliminates the barrier layer, and the deoxidization reaction proceeds smoothly.

It was also found that the viscous liquid deoxidizer acts as an adhesive agent between the substrate and the covering material. The viscous liquid deoxidizer also grips the rough surface of the substrate and the covering material, which can be described as an anchoring effect, thereby preventing an uneven distribution of the deoxidizer within the deoxidizing sheet.

In the case of a deoxidizing sheet obtained by transferring the viscous liquid deoxidizer onto a substrate, since the deoxidizer is made in the form of viscous liquid and transferred onto the substrate, the water content of the barrier layer for the metal powder is absorbed by the pouch material. The deoxidizing sheet thus becomes porous and the oxidation reaction starts proceeding gradually. As the water content is lost, the gas-permeability of the deoxidizing sheet becomes emphasized. Since the air is gradually supplied through the surface, the deoxidization reaction becomes stable, and an excellent deoxidizing effect can be obtained for a long period of time.

It was also found that a thin deoxidizing sheet can be produced by laminating a viscous liquid deoxidizer on a film-like or sheet-like substrate, covering the deoxidizer with a film-like or sheet-like covering material, having stuck together the substrate and the covering material by the viscosity of the viscous liquid deoxidizer, and blanking the laminate into a predetermined shape. Furthermore, by uniformly distributing and then fixing the viscous liquid deoxidizer within a pouch, a shifting and uneven distribution of the viscous liquid deoxidizer can be prevented, and uniform oxidation reaction proceeds throughout the deoxidizer in the deoxidizing sheet, thereby obtaining an excellent deoxidizing effect.

The present invention was made based on the above-described technological findings.

It is an object of the present invention to provide a viscous liquid deoxidizer and a deoxidizing sheet using this viscous liquid deoxidizer. They have the following effects of: preventing scattering of metal powder during production of a deoxidizer or a deoxidizing sheet and a deterioration of the work environment; preventing a loss of deoxidizing capability or deterioration of the quality of the deoxidizer and coagulation of the deoxidizer due to undesired oxidation reaction during production by suppressing the deoxidization reaction of the deoxidizer; preventing various difficulties associated with the coagulation of the deoxidizer; making possible a uniform distribution of the viscous liquid deoxidizer by adopting transfer or lamination methods such as printing or coating such as screen printing; maintaining the quality of the product by improving the precision of the lamination; easily producing thin deoxidizing sheets at a high rate of production; uniformly distributing and then fixing the viscous liquid deoxidizer within a pouch by laminating the viscous liquid deoxidizer on a water absorptive substrate or covering material, thereby preventing the deoxidizer from shifting its position and being distributed unevenly; and having a uniform oxidation reaction throughout the distribution of the deoxidizer in the deoxidizing sheet, thereby obtaining an excellent deoxidizing effect.

In order to accomplish the above-described objective, a viscous liquid deoxidizer of the present invention includes a metal powder, a tackifier and water as essential components, where the metal powder is a reacting component. It is a feature of the present invention that the deoxidizer is made in the form of a viscous liquid.

Conventionally, a powdery deoxidizer itself acts as a porous body. Consequently, it has a large surface area, making ample contact with the air. Therefore, when ingredients are being mixed to produce the deoxidizer, or when the deoxidizer is placed on a substrate to form a deoxidizing sheet, or during a time period until the deoxidizing sheet is placed in a non-gas-permeable bag, an oxidation reaction with the air proceeds smoothly and continuously. This results in a loss of reactive capability of the deoxidizer, thereby deteriorating the quality of the deoxidizer.

Moreover, a conventional powdery deoxidizer undergoes oxidation reaction immediately. This reaction proceeds continuously and results in the coagulation of reaction products, which may cause irregularity of an amount of the deoxidizer dropped onto a substrate or adhesion of the coagulants to the inside of a hopper or the like, resulting in a low yield of the product. Difficulties associated with this phenomenon further include formation of a bridge in the vicinity of the discharging port of the container, failure to smoothly drop the powdery deoxidizer, difficult handling, complicated maintenance of the production facilities, limitations imposed upon the operating hours for the production facilities and the working hours of workers, processing of the coagulants, etc.

Moreover, if the deoxidizer is in the form of powder, then, as previously described, oxidation reaction occurs during a time period between the time when the deoxidizing sheet is produced and the time when the deoxidizing sheet thus produced is placed and sealed in a non-gas-permeable outer bag. The quality of the deoxidizer is, therefore, deteriorated, and the reliability decreases.

However, since, in the present invention, the deoxidizer is made in the form of a viscous liquid, the following merits can be obtained.

Specifically, transfer or lamination of the viscous liquid deoxidizer can be considerably easily performed by printing or coating such as screen printing. And, a thin deoxidizing sheet can be produced at a high rate of production, and the deoxidizer can be uniformly distributed in a pouch. Furthermore, if the viscous liquid deoxidizer is laminated on a substrate such as a foamed film sheet, paper, unwoven fabric such as rayon unwoven fabric, woven fabric or a porous film sheet, then, since this viscous liquid deoxidizer has a great tendency to permeate the substrate and be anchored, the deoxidizer grips the minute pores, preventing its shifting or uneven distribution.

Particularly, if, in this case, the substrate is water-absorbent and the viscous liquid deoxidizer is laminated on this substrate, or if a water absorptive layer is additionally laminated on the substrate and the deoxidizer is laminated on this water absorptive layer, then all or a part of the deoxidizer is more easily fixed on the substrate or on the water absorptive layer formed on the substrate, thereby preventing the shifting or uneven distribution of deoxidizer.

Moreover, by using a lamination method such as printing and coating such as screen printing, the deoxidizing sheet can be made considerably small. Furthermore, compared with a conventional powdery deoxidizer, the viscous liquid deoxidizer has less contact area with the air, which puts a restriction on an oxidation amount per unit of time. As a result, a film-like or sheet-like covering material is laminated thereon, and the oxidation reaction is substantially halted until the deoxidizing sheet is obtained.

In the present invention, the deoxidizer is made in the form of a viscous liquid, and the air supply to the metal powder decreases, substantially stopping the oxidation reaction. As a result, a loss of deoxidizing capability, deterioration of the quality or coagulation of the reacted deoxidizer as well as harm resulting therefrom during production can be prevented, thereby obtaining a highly reliable deoxidizing sheet with a stable quality.

As described above, the present invention relates to a viscous liquid deoxidizer. Since the deoxidizer is in the form of a viscous liquid, it has a considerably high fluidity compared to a conventional moist powdery deoxidizer. The deoxidizer of the present invention makes it possible to continuously and accurately laminate the deoxidizer on a predetermined region of a substrate which is fed at high rate of speed in such a manner that the lamination is uniform and considerably thin.

Therefore, since the deoxidizer can be laminated considerably thin on a substrate, a thin deoxidizing sheet can be obtained. Since the deoxidizing sheet can be made thin, a noticeable effect that the deoxidizing sheet is flexible and can be used in any type of food container can be realized.

Furthermore, since the deoxidizer of the present invention can be uniformly and accurately distributed for lamination on a predetermined region of the substrate, uneven oxidation reaction due to uneven distribution of the deoxidizer can be prevented, thereby realizing efficient deoxidizing effect.

In the present invention, the viscous liquid deoxidizer is laminated at a high rate of speed on at least one predetermined region on the surface of the substrate in a predetermined shape by printing or coating. Then, a film-like or sheet-like covering material is placed so as to cover the deoxidizer.

Moreover, the deoxidizer of the present invention is in the form of a viscous liquid. Therefore, its surface area is considerably small when compared with a powdery deoxidizer, which considerably reduces contact with the air so that oxidation reaction is practically prevented.

As a result, a loss of deoxidizing capability due to undesired oxidation reaction during production, coagulation of oxidation reactants, deterioration of the quality of the deoxidizer, etc. can be totally prevented. Consequently, a decrease in the yield, difficulties in handling, complication of maintenance of the production facilities, limitations imposed on the operating hours for production facilities and the working hours of workers, difficulties associated with coagulant processing, etc. can be avoided. As a result, an effect that a deoxidizing sheet of high quality and reliability can be produced at a lower cost.

In order to further accomplish the aforementioned objective, a viscous liquid deoxidizing sheet of the present invention includes a film-like or sheet-like substrate, the viscous liquid deoxidizer of the present invention laminated thereon, and a film-like or sheet-like covering material covering the deoxidizer. It is a feature of the present invention that at least a part of a pouch which is made of the substrate and the covering material is gas-permeable.

Since a conventional powdery deoxidizer has moisture clue to water content and considerably lacks fluidity because of its powdery characteristics, it is extremely difficult to uniformly distribute the deoxidizer onto a predetermined region of the substrate by simply dropping it thereonto.

However, since the deoxidizer of the present invention is in the form of viscous liquid, it can be printed, coated or transferred on the substrate by a head coater, a roller, an applicator, etc., using known printing technologies such as thick printing, gravure printing, offset printing, screen printing, spraying, etc. In addition, the viscous liquid deoxidizer can be used to produce thin deoxidizing sheets at a high rate of production. Furthermore, since the deoxidizer is in the form of a viscous liquid, it has a considerably small contact area with the air, which reduces the air supply so as to practically prevent oxidation reaction.

In a case where the viscous liquid deoxidizer includes excess water content which acts as a barrier layer so that the deoxidizer is more stable, if the excess water content is directed to be absorbed by a pouch material such as a substrate and a covering material or by a water absorptive layer, then the barrier layer disappears and inconvenience associated with the excess water can be resolved.

Since the deoxidizing sheet is thin, a noticeable effect that the deoxidizing sheet is flexible and can be used in any type of food container can be realized.

Furthermore, since, in the deoxidizing sheet of the present invention, the deoxidizer is uniformly and accurately distributed for lamination on a predetermined region of the substrate, uneven oxidation reaction due to uneven distribution of the deoxidizer can be prevented, thereby realizing an efficient deoxidizing effect.

In the deoxidizing sheet of the present invention, the quality of the deoxidizer within the pouch is stable. In addition, the deoxidizing sheet has the excellent deoxidizing effect as described above and can be produced at low cost.

Moreover, when the substrate and/or the covering material of the deoxidizing sheet of the present invention is water absorptive, excess water content, free water or a part of water content within the water-containing gel can be absorbed by the substrate and/or the covering material by the time when the deoxidizing sheet is placed and sealed in a food container, thereby adjusting the mixing ratio of water content within the deoxidizing sheet to be at a value suited for oxidation reaction. As a result, the desired deoxidizing effect can be realized at the time when the deoxidizing sheet is placed and sealed in a food container, and the water content chemically absorbed in the course of oxidation reaction can be supplemented by the discharge of water content from the substrate and/or the covering material. Therefore, the desired deoxidizing effect can be maintained for a long period of time.

In a case where the substrate and/or the covering material of the deoxidizing sheet of the present invention is water absorptive, as the substrate and/or the covering material absorbs excess water, free water or a part of the water content within the water-containing gel, the deoxidizer is attracted to the substrate and/or the covering material, a part of the deoxidizer wedging itself into the substrate and/or the covering material. This is referred to as an anchoring effect, by which an effect is realiced that the deoxidizer can be fixed to the substrate and/or the covering material.

As a result, the shifting or the uneven distribution of deoxidizer within a pouch can be prevented more securely. Consequently, uneven oxidation reaction due to the uneven distribution of deoxidizer can be securely prevented, and the deoxidizing effect can be realized more uniformly and more efficiently throughout the entire distribution of deoxidizer If the substrate or the covering material of the deoxidizing sheet of the present invention has an adhesive layer laminated at least on a part of the surface of either the substrate or the covering material, then an effect that the deoxidizing sheet of the present invention can be easily attached and fixed on the inner surface of a food container such as a bag can be realized.

It is another object of the present invention to provide a method for producing a deoxidizing sheet having an excellent deoxidizing effect. It has the following effects of: producing a thin deoxidizing sheet by forming a viscous liquid deoxidizer, laminating the viscous liquid deoxidizer on at least one predetermined region of the upper surface of a film-like or sheet-like substrate, and then placing a film-like or sheet-like covering material so as to cover the viscous liquid deoxidizer; producing a thin deoxidizing sheet which prevents a loss of deoxidizing capability, the deterioration of the quality and coagulation of the deoxidizer due to undesired oxidation reaction during production by suppressing the oxidation reaction of the viscous liquid oxidizer, and which prevents difficulties associated with the coagulation of the deoxidizer; and producing a thin deoxidizing sheet which prevents the shifting and uneven distribution of the deoxidizer, thereby obtaining a uniform deoxidization reaction throughout the deoxidizer in the deoxidizing sheet and realizing an excellent deoxidization effect.

In order to accomplish the aforementioned objective, a first method of the present invention for producing a deoxidizing sheet includes the steps of producing a viscous liquid deoxidizer, laminating the viscous liquid deoxidizer on at least one predetermined region of the upper surface of a film-like or sheet-like substrate, and placing a film-like or sheet-like covering material over the viscous liquid deoxidizer. In the first method of the present invention, at least one of or a part of the substrate and the covering material is gas-permeable.

Since, in the first method of the present invention, the deoxidizer is formed in the form of a viscous liquid, the following advantages result.

Since the viscous liquid deoxidizer is used in the first method of the present invention, lamination by printing or coating such as screen printing can be performed quite easily, and thin deoxidizing sheets of the present invention can be produced at a high rate of speed. If the deoxidizer of the present invention is interposed between the substrate and the covering material which are made of foamed film sheet, paper, unwoven or woven fabrics or porous film sheet, then, since the deoxidizer tends to infiltrate and be anchored, the deoxidizer wedges itself into minute pores of the substrate or the covering material, thereby preventing the shifting or uneven distribution of the deoxidizer.

In this case, if the substrate and/or the covering material is particularly water absorptive and the deoxidizer of the present invention is laminated on this substrate, or if a water absorptive layer is additionally laminated on the substrate and the deoxidizer of the present invention is laminated on the water absorptive layer and covered by the covering material, then all or a part of the deoxidizer is fixed more easily on the water absorptive substrate and/or covering material or on the water absorptive layer formed thereon. As a result, the shifting and the uneven distribution of deoxidizer can be prevented.

Moreover, since the deoxidizer used in the first method of a the present invention is formed in the form of viscous liquid, the aforementioned advantages are obtained. Particularly, if the ratio of water content is made excessive during production of the deoxidizer, then transfer or lamination by printing or coating can be performed quite easily, and thin deoxidizing sheets can be produced at a high rate of speed. Furthermore, since the surplus water content serves as a barrier layer, the supply of air is reduced and deoxidization reaction can be halted more securely. As a result, a loss of deoxidizing capability, deterioration of the quality of deoxidizer, and coagulation of oxidation reactants are more securely prevented.

In the first method of the present invention, if the ratio of water content is high and the surplus water content is acting as a barrier layer, then by making a part of the water content of the deoxidizer to be absorbed by the substrate and/or the covering material, the barrier layer can be eliminated and various problems associated with the excess water content can be resolved.

In a case where food should avoid moisture, if the deoxidizer of the present invention is dried after being laminated on the substrate, then the food does not become moist, and an effect can be realized that oxygen in the air within the food container can be effectively absorbed.

It is still another object of the present invention to provide a method for producing a deoxidizing sheet including the steps of providing a film-like or sheet-like substrate and a film-like or sheet-like covering material, at least one of which is water absorptive or processed for water absorbency, laminating a viscous liquid deoxidizer on the film-like or sheet-like substrate, covering the deoxidizer with a film-like or sheet-like covering material and joining the substrate and the covering material by the viscosity of the viscous liquid deoxidizer, and blanking the resultant laminate into a predetermined shape. It has the following effects of: preventing a loss of deoxidizing capability and the deterioration of the quality of deoxidizer and various difficulties associated with the coagulation of the deoxidizer due to undesired oxidation reaction during production; producing a thin deoxidizing sheet; preventing the shifting and uneven distribution of deoxidizer; and having a uniform oxidation reaction throughout the deoxidizer in the deoxidizing sheet, thereby realizing an excellent deoxidizing effect.

In order to accomplish the aforementioned objective, a second method of the present invention for producing a deoxidizing sheet includes the steps of laminating the viscous liquid deoxidizer on a film-like or sheet-like substrate, placing a film-like or a sheet-like coating material over the deoxidizer, putting together the substrate and the covering material by the viscosity of the viscous liquid deoxidizer, and blanking the resultant laminate into a predetermined shape. In the second method of the present invention, at least one of or a part of the substrate and the covering material is gas-permeable.

Therefore, a thin deoxidizing sheet can be produced. Furthermore, since the viscous liquid deoxidizer is used, a barrier layer is formed by a surplus water content, which inhibits oxidation reaction and prevents a loss of deoxidizing capability during production, deterioration of the quality of deoxidizer, and various difficulties associated with the coagulation of oxidation reactants. Moreover, by uniformly distributing and fixing the deoxidizer within a pouch, the shifting and uneven distribution can be prevented. Consequently, uneven oxidation reaction due to uneven distribution of the deoxidizer can be prevented, and an effect can be realized that the deoxidizing sheet having efficient deoxidizing effect can be produced at low cost.

In a case where food should avoid moisture, if the deoxidizer of the present invention is dried after being laminated on the substrate, then the food does not become moist, and an effect can be realized that oxygen in the air within the food container can be effectively absorbed.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

Figure 1:
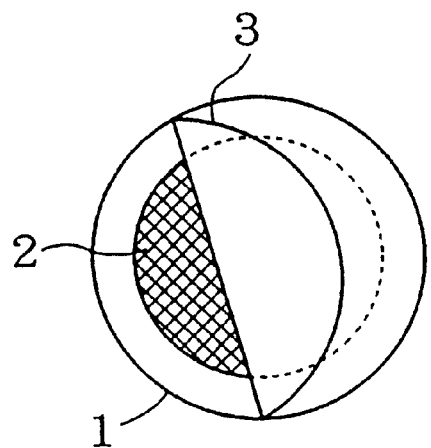
FIG. 1 is a plan view of a deoxidizing sheet according to the present invention.

The present invention will be described as follows.

A feature of a deoxidizer in the present invention is that it is a viscous liquid deoxidizer, not a powdery deoxidizer which is conventionally used.

More precisely, a feature of the deoxidizer of the present invention is that metal powder is a reactive component and that a thixotropic agent and water, together with the metal powder, constitute essential components. The deoxidizer then takes the form of a viscous liquid.

The only requirement for the deoxidizer of the present invention is that it reacts with oxygen in the air causing a deoxidization reaction (oxidation reaction) and that it tends to flow when acted on by an external force or it can be transferred or laminated on a substrate by printing or coating such as screen printing. The deoxidizer of the present invention includes those which satisfy these requirements.

The deoxidizer of the present invention includes a metal powder as a reactive component, and then a thixotropic agent and water are added to the metal powder so that the mixture takes the form of a viscous liquid. The mixing ratio depends on the kind of metal powder and thixotropic agent and, since the degree of oxygen absorption differs for the different kinds of metal powders and thixotropic agents, it cannot be uniquely determined. In general, about 0.1–10 parts by weight of thixotropic agents, or preferably about 0.15–7.5 parts by weight of thixotropic agents, or more preferably about 0.25–5 parts by weight of thixotropic agents is used for about 100 parts by weight of metal powder. In the present invention, water is added to these ingredients so as to make the mixture to be like a viscous liquid as a whole.

In this case, water can be added after the solid ingredients are mixed for the deoxidizer, or all ingredients of the deoxidizer can be mixed simultaneously.

When there is an excess water content, no particular limitations are imposed upon a mixing device for these ingredients as long as a uniform mixture can be obtained. In the case of a deoxidizer which has a relatively small water content, a kneading device such as a kneader, a mixer or the like is preferable since uniform deoxidizer can readily be obtained. In the case of the deoxidizer having relatively small water content, squeezed free water or a gel containing water surrounds a particle of the metal powder and functions as a barrier layer.

Then, in the present invention, the deoxidizer is made in the form of a viscous liquid and, therefore, a transfer of the deoxidizer by printing or coating can be easily performed. It is preferable that the viscosity (at 20° C.) of the viscous liquid deoxidizer thus produced is in the range of about 1,000 to 8,500,000 cps. This can be achieved as follows.

If the viscosity of the present invention is as low as less than 1,000 cps, then the transferability of the deoxidizer by printing or coating becomes poor. Moreover, since the water content becomes too large, the transfer amounts of other components become short, resulting in a small amount of oxygen to be absorbed. The viscosity becomes low and the metal powder becomes isolated, making it difficult to maintain the uniformity of the ingredients. Furthermore, the deoxidizer oozes out of a prescribed region of the substrate, and since it is necessary that the substrate and/or the covering material absorbs large amount of water after the transfer, it becomes necessary to use the substrate and/or the covering material having a special structure or to fabricate the deoxidizing sheet in a complicated structure. This is not preferable. On the other hand, if the viscosity exceeds 8,500,000 cps, then the transferability also becomes poor. This is not preferable since it results in an uneven transfer and the possibility of having oxidation reaction on the surface. Therefore, because of the reasons described above, it is preferable to have the viscosity in the range of about 5,000 to 7,500,000 cps, or more preferably in the range of about 10,000 to 7,000,000 cps.

The viscosity is measured at a measuring temperature of 20° C. by a R110 viscometer manufactured by Touki Sangyo K. K. (RE110U system, detection head RE100U, controller RC100A) with SPP rotor at 0.2 rpm (D=0.4(1/S)).

The viscosity represents the value when the deoxidizer is being transferred and laminated.

In the present invention, the deoxidizer contains metal powder as a reactive component. Added to this metal powder are a thixotropic agent and at least one selected from the group consisting of a carbon component, silica gel, zeolite and activated clay (referred to as a reaction promoter, hereinafter). Then, water is added to these ingredients so as to make the deoxidizer in the form of a viscous liquid. Such deoxidizer is preferably used because oxidation reaction proceeds smoothly.

In this case, the mixing ratio depends on the kinds of metal powder, the thixotropic agent and the reaction promoter and, since the degree of oxygen absorption differs for the different kinds of metal powders, the thixotropic agents and the reaction promoters, it cannot be uniquely determined. In general, about 0.1–10 parts by weight of thixotropic agent and about 0.1–20 parts by weight of reaction promoter, or preferably about 0.15–7.5 parts by weight of thixotropic agent and about 0.5–15 parts by weight of reaction promoter, or more preferably about 0.5–5 parts by weight of thixotropic agent and about 1–12.5 parts by weight of reaction promoter are used for about 100 parts by weight of metal powder. Such mixture is added with water so as to make the deoxidizer in the form of a viscous liquid.

In this case, the deoxidizer is made in the form of a viscous liquid, and the same mixing method as described above is used. As described above, it is generally preferable to have the viscosity of the deoxidizer in the range of about 1,000–8,500,000 cps using the above-described method.

Furthermore, in the present invention, the deoxidizer contains metal powder as a reactive component, and a thixotropic agent and a reaction promoter are added to the metal powder. Further added to the metal powder is calcium hydroxide or magnesium hydroxide or a mixture of both, which are a hydroxide of alkaline-earth metal, or dolomite (referred to as an activator, hereinafter). Added to this mixture is water, aqueous solution or dispersion solution of metal chloride, so that the deoxidizer is made in the form of a viscous liquid. The deoxidizer thus produced is preferably used because oxidation reaction proceeds smoothly.

The mixing ratio depends on the kinds of metal powder, the thixotropic agent, the reaction promoter and the activator. In general, about 0.1–10 parts by weight of thixotropic agent, about 0.1–15 parts by weight of reaction promoter and about 0.1–15 parts by weight of activator, or preferably about 0.15–7.5 parts by weight of thixotropic agent about 0.25–12.5 parts by weight of reaction promoter and about 0.25–12.5 parts by weight of activator, or more preferably about 0.25–5 parts by weight of thixotropic agent, about 0.5–10 parts by weight of reaction promoter and about 0.5–10 parts by weight of activator are used for about 100 parts by weight of metal powder. In the present invention, such mixture is added with water, aqueous solution or dispersion solution of metal chloride so as to make the deoxidizer in the form of a viscous liquid.

No particular limitations are imposed upon the aqueous solution or dispersion solution of metal chloride. However, the aqueous solution or dispersion solution of metal chloride in the range of about 0.1–20% by weight, or preferably about 0.5–15% by weight, or more preferably about 1–10% by weight is used.

In this case, the deoxidizer is made in the form of viscous liquid, and the same mixing method as described above is used. Moreover, it is preferable that the viscosity of the viscous liquid deoxidizer is in the range of about 1,000–8,500,000 cps (at a temperature of about 20° C.) when produced in the above-described method as described above.

Furthermore, in the present invention, the above-described deoxidizer is further added with at least one selected from the group consisting of a pH adjuster, a surfactant and a defoamer which enhances dispersability (referred to as an additive, hereinafter), so as to make the deoxidizer in the form of viscous liquid. The deoxidizer thus produced has better deoxidization efficiency of metal powder and, therefore, is preferable.

Generally, it is preferable to have about 0.1–10 parts by weight of additive for about 100 parts by weight of metal powder. In the present invention, the mixture is added with water so that the deoxidizer is made in the form of a viscous liquid.

In the above-described case, when metal chloride is used, the aqueous solution or dispersion solution of the metal chloride which is prepared beforehand can be used instead of water. No particular limitations are imposed upon the aqueous solution or the dispersion solution. However, the aqueous solution or the dispersion solution contains about 0.1–20% by weight, or preferably about 0.5–15% by weight, or more preferably about 1–10% by weight of metal chloride.

In the above-described deoxidizer, when the aqueous solution or dispersion solution of the metal chloride is used, it is preferable to have about 0.1–20 parts by weight, or preferably about 0.5–15 parts by weight, or more preferably about 1–10 parts by weight of metal chloride for about 100 parts by weight of metal powder.

Also in this case, the deoxidizer is made in the form of a viscous liquid, and the same mixing method as described above is used. As described above, the deoxidizer thus produced preferably has a viscosity in the range of about 1,000–8,500,000 cps (at a temperature of 20° C.).

In the present invention, an oxygen absorbent can further be mixed in the above-described viscous liquid deoxidizer. The mixing ratio of the oxygen absorbent is preferably about 0.5–50 parts by weight with respect to 100 parts by weight of metal powder. If the ratio is less than 0.5 parts by weight, then there is no practical advantage. If the ratio exceeds 50 parts by weight, then a deoxidizing effect reaches a saturation point and not only no practical advantage is appreciated but it also becomes economically disadvantageous. Therefore, from these consideration, it is preferable that the oxygen absorbent is in the range of about 1–30 parts by weight, or preferably about 2–25 parts by weight for 100 parts by weight of metal powder.

No particular limitations are imposed upon the above-mentioned oxygen absorbent. Those which can be used as the oxygen absorbent include sodium chondroitin sulfate, thiamine hydrochloride, ascorbic acid, dibutylhydroxytoluene, dl-α-tocopherol, reducing sugar, ferrous salt, ferrosilicon, silicon manganese, or calcium silicide. These preferably have high oxygen-absorbing capablity. Any of the above can be used alone or in combination of two or more.

In the present invention, substances which absorb water or the aqueous solution of metal chloride, thereby increasing the viscosity, or impart thixotropy can be used as the above-described described thixotropic agent. These substances include bentonite, polyacrylate such as stearates and sodium polyacrylate, gelatine, polyethylene oxide, polyvinyl alcohol, polyvinyl pyrrolidone, gum arabic, tragacanth gum, locust bean gum, gua gum, alginates such as sodium alginate, pectin, carboxy vinyl polymer, dextrin, α-starch, starch flour-type water absorber such as starch flour for processing, carragenan, polysaccharide-type tackifiers such as agar, carboxymethyl-cellulose (CMC) or its alkali metal salt, cellulose-derivative-type thixotropic agents such as ethyl cellulose acetate, hydroxy ethyl cellulose, methyl cellulose or hydroxy propyl cellulose, water-soluble cellulose ether and poly-N-vinyl acetamide. Any of these substances can be used alone or in combination of two or more. Furthermore, these substances can be treated with or combined with a surfactant so as to enhance hydrophilicity. Primary function of these thixotropic agents is to absorb water or an aqueous solution of metal chloride, thereby increasing the viscosity or imparting thixotropy.

In the present invention, no particular limitations are imposed on the metal powder as long as it reacts with oxygen in the air. Specifically, examples of such metal powder include an iron powder, a zinc powder, an aluminum powder or a magnesium powder, or a powder of an alloy made of any two or more of these metals. Further included is a mixed metal powder obtained by mixing any two or more of the above metal powders. Particularly, the iron powder is most preferable to use since it has the best characteristics when considering various factors such as safety, handling, cost, storage, stability, etc.

Examples of the carbon component include carbon black, graphite and active carbon. Examples of the metal chloride include chloride of alkaline metal such as sodium chloride and potassium chloride, and chloride of alkaline-earth metal such as calcium chloride and magnesium chloride.

Examples of the above-described pH adjuster, surfactant and defoamer used in the present invention include those which are commonly used in this field.

Next, a deoxidizing sheet of the present invention will be described as follows.

The deoxidizing sheet of the present invention is made of a film-like or sheet-like substrate, the above-describe deoxidizer of the present invention laminated on the substrate, and a film-like or sheet-like covering material which covers the deoxidizer, where either the substrate or the covering material, or both, are gas-permeable.

In other words, it is a feature of the present invention to use the above-described viscous liquid deoxidizer in the deoxidizing sheet.

Since the deoxidizer used in the deoxidizing sheet serves as an adhesive, thereby putting together the substrate and the covering material, it is not necessarily required to seal the deoxidizing sheet along the periphery thereof. However, in order to improve the quality and reliability of the deoxidizing sheet, it is preferable to seal the deoxidizing sheet along the periphery by thermal adhesion, adhesion, thermal fusion, or the like.

No particular limitations are imposed upon a method for sealing. The sealing can be performed at the same time as the covering material is placed over the deoxidizer laminated on the substrate, or it can be performed after the covering material is placed and when, for example, blanking or weld-cutting is performed.

Assuming that the substrate and the covering material are bonded along the periphery by heat-setting or heat-sealing, when performing the above-mentioned sealing, it is preferable that the blanking or the weld-cutting is performed by a roller for heat-setting or heat-sealing at the same time as the above-mentioned bonding is being performed from a standpoint of cutting down production steps, hours and cost.

Moreover, a part of water content of the aforementioned viscous liquid deoxidizer is preferably absorbed in the substrate and/or the covering material. This makes the removal of oxygen in air to be done smoothly and promptly, and the oxidation of food is prevented more securely.

Therefore, it is preferable that the substrate and/or the covering material is water absorptive. However, no particular limitations are imposed on this water absorptive material as long as it is in the form of a film or a sheet and has a water absorptive property.

The substrate and the covering material of the deoxidizing sheet of the present invention are basically made of a similar material.

In the deoxidizing sheet of the present invention, all or a part of the deoxidizer is preferably fixed to the substrate and/or the covering material, thereby preventing the shifting or uneven distribution of the deoxidizer.

Specifically, the shifting or the uneven distribution of deoxidizer is prevented as follows. If the surfaces of the substrate and/or the covering material are smooth at the region where they make contact with the deoxidizer, roughness is provided there either mechanically or by providing a water absorptive layer having a water absorption property laminated on at least one of the surfaces of the substrate and/or the covering material which are either gas-permeable or non-gas-permeable. This enhances the adhesion of the deoxidizer resulting from the water absorption from the deoxidizer and the bonding between the rough surface and the deoxidizer. Preferably, if the substrate and/or the covering material is made of a porous material such as an unwoven fabric, the shifting or the uneven distribution of the deoxidizer can be prevented more securely because of the bonding of the deoxidizer and the anchoring effect.

No particular limitations are imposed on the aforementioned water absorptive material as long as the water absorption result is obtained, regardless of the water absorption property of the material itself.

Specifically, examples of the water absorptive material include water absorptive foamed film sheet, blotting paper, thin paper for household use such as a toilet roll and a paper towel, thick paper such as cardboard and corrugating medium thereof, and woven fabric or unwoven fabric such as rayon, or unwoven fabric made of water absorptive fibers. Also included in the examples are those which are formed of a water absorptive material such as water absorptive porous film sheet.

Moreover, regardless of whether the material itself has water absorptive property or not, the examples include those which are imparted with the water absorptive property or whose water absorptive property is enhanced by providing a water absorbent by immersion, kneading, transfer, or the like within water absorptive foamed film sheet, paper, thick paper such as cardboard and corrugating medium thereof, woven fabric or unwoven fabric such as rayon unwoven fabric made of water absorptive fibers, and a porous film sheet. The examples also include those which are imparted with the water absorptive property by putting the water absorptive foamed film sheet, various kinds of paper, woven or unwoven fabrics or porous film sheet, which is cut in a shape of a plan view of the deoxidizer, to another foamed film sheet, paper, woven or unwoven fabrics or porous film sheet where the deoxidizer is inserted therebetween, that is, those which include a water absorptive layer laminated on the inside surface of at least one of the substrate and the covering material.

In the deoxidizing sheet of the present invention, the water absorptive layer is formed at least in a region of the substrate and/or the covering material where it makes contact with the deoxidizer by providing a water absorbent thereto by immersion, kneading, transfer, or the like. Then, all or a part of the deoxidizer grips on and is bonded to the roughness and/or to the water absorptive layer, thereby preferably preventing the shifting and the uneven distribution of deoxidizer.

Moreover, in the deoxidizing sheet of the present invention, in order to more securely prevent the shifting and the uneven distribution of deoxidizer, the roughness and/or the water absorptive layer are preferably formed in the region of the substrate and the covering material as described above where it makes contact with the deoxidizer. These roughness and/or the water absorptive layer prompts the absorption of water content within the deoxidizer to the substrate and/or to the covering material.

Since the deoxidizer is prevented from shifting and moving around within a pouch, non-uniform or uneven oxidation reaction can be prevented, thereby making a full use of the deoxidizer.

When the surfaces of the substrate and/or the covering material are smooth, no particular limitations are imposed on a method for providing roughness on the surface. Specifically, it is preferable to perform mechanical treatment such as corona treatment in order to obtain the roughness.

Particularly, in a case where at least a part of the substrate and/or the covering material which is in contact with the deoxidizer is water absorptive, components of the deoxidizer other than the water content are attracted to the substrate and/or to the covering material. Then, a part of the attracted components infiltrates the water absorptive layer and causes a strong anchoring effect. Therefore, any special treatment designed for providing surface roughness is not required.

Examples of the above-described water absorbent include the above-described water absorptive polymer, the thixotropic agent, and the like. Therefore, layers formed of the above-described water absorptive polymer or thixotropic agent are used as the water absorptive layer.

As described above, examples of the substrate and/or the covering material used in the deoxidizing sheet of the present invention include those which are single-layered and those which have a plurality of layers laminated in the direction of thickness.

In this case, the lamination not only refers to those where layers are bonded either on a part of the surface or on the entire surface of the layers by heat-setting, adhesion, viscosity, thermal fusion or lamination but also to those where layers are simply stacked and are bonded in the localized region such as the central region, the periphery region, etc. by heat-setting, adhesion, viscosity, thermal fusion or lamination.

In a case where the substrate and/or the covering material is formed of a single layer (a single film or sheet), in order to prevent the deoxidizer from shifting and unevenly distributing itself, it is preferable to provide roughness to the surface thereof if a film sheet to be used has a smooth surface or to use a foamed film sheet, paper, woven and unwoven fabrics, or a porous film sheet as described above. If these materials are made of water absorptive materials, or if, for example, they are formed of water absorptive fibers, then these materials are used without any processing. If these materials are made of materials which are not water absorptive, then the water absorptive property can be imparted by providing a water absorbent to these materials by immersion, kneading, transfer or lamination.

In this case, if a foamed film sheet such as sponge, or woven or unwoven fabrics is used, then excellent adhesion to an adhesive layer, which is to be described later, can be obtained. Moreover, examples of the substrate which includes a plurality of layers, that is, two layers or more of the film or sheet include those described above.

A thickness of the aforementioned substrate and the covering material differs greatly, depending on the usage, and, therefore, no particular limitations are imposed thereupon. Specifically, it is generally preferable to have the thickness in the range of about 10–1,000 μm.

If the thickness of the substrate and the covering material is less than 10 μm, then it becomes difficult to obtain a necessary mechanical strength. It also becomes difficult to obtain a uniform thickness. Therefore, such thickness is not preferable.

If the thickness of the substrate and the covering material exceeds 1,000 μm, then it does not serve a practical purpose. Its handling becomes poor and the total thickness of the deoxidizing sheet becomes too thick. Therefore, such thickness is not preferable.

Examples of materials for the substrate and the covering material include either synthetic or natural high molecular material.

Specifically, examples of the synthetic high molecular material include polyethylene, polypropylene, polyamide, polyester, poly(vinyl chloride), poly(vinylidene chloride), polyurethane, polystyrene, ethylene-vinyl acetate copolymer saponification compound, and ethylene-vinyl acetate copolymer.

Examples of methods for imparting gas-permeability to a film or a sheet made from the aforementioned non-foam high molecular material include a method where vent holes are formed by drawing when the film or sheet is being made, a method where vent holes are formed by further extracting a specific component from the above-mentioned drawn film or sheet, and a method where a non-foam film or sheet is formed first, and then vent holes are formed by mechanical perforation such as punching and needling. In these methods, a porous film or sheet can be obtained.

Moreover, the foamed film or sheet made from high molecular material can be classified into two categories. One is those which are imparted with the gas-permeability either by forming stand-alone bubbles or chain-linked bubbles by foaming, which appear on both top and bottom surfaces, or by pressing the film or sheet after foaming so that the stand-alone bubbles or the chain-linked bubbles formed within are broken, thereby providing a passage-way between the top and bottom surfaces. The other is those which do not have gas-permeability and exhibit air-tightness even after foaming.

Paper or cloth such as knitted fabric, woven fabric and unwoven fabric has, because of its structure, vent holes or passage-ways connecting the top and bottom surfaces, thereby exhibiting gas-permeability. In order to produce such cloth, natural fiber, regenerated fiber using natural material such as viscose fiber, semi-synthetic fiber and synthetic fiber can be used either alone or in combination of any two or more of the above.

Examples of natural fiber include plant fiber such as cotton and hemp and animal fiber such as silk and animal hair. Examples of high molecular materials constituting synthetic fiber include polyethylene, polypropylene, polyamide, polyester, poly(vinyl chloride), poly(vinyl vinylidene), polyurethane, polystyrene, and ethylene-vinyl acetate copolymer saponification compound or ethylene-vinyl acetate copolymer.

The deoxidizing sheet of the present invention is designed to remove oxygen in the air within a food container for a long period of time. Therefore, it is necessary that at least a part of the pouch made of a substrate and a covering material is gas-permeable.

In the deoxidizing sheet of the present invention, it is required that the pouch is gas-permeable on its side, or that either the substrate or the covering material, or at least a part thereof, is gas-permeable. In this context, the side refers to a side portion of the pouch where there is an unsealed interface between the substrate and the covering material on the periphery. In this case, both the substrate and the covering material can be made of a material which is not gas-permeable. In other words, if the sealing is partly done around the circumference of the deoxidizer, then the unsealed part, or the side of the pouch as referred to above, exhibits gas-permeability. As a result, slow oxidation reaction occurs and a deoxidizing effect is therefore maintained for a longer period of time.

No particular limitations are imposed on a method for making the substrate or the covering material partly gas-permeable. For example, when the substrate or the covering material is made of a single layer, an adhesive agent can be partly applied onto the surface of the gas-permeable substrate or covering material so as to block the area. If the substrate or the covering material is made of a plurality of layers, a film or a sheet which is partly provided with vent holes on the surface is laminated on a gas-permeable film or sheet.

In the deoxidizing sheet of the present invention, no particular limitations are imposed on a shape of the region where the deoxidizer is laminated. The shape can be arbitrarily determined depending on the shape of a food container.

No particular limitations are imposed on a shape and dimensions of the substrate and the covering material as long as the shape and dimensions thereof are larger than those of the deoxidizer laminated on the substrate. Particularly, it is preferable that the substrate and the covering material have a similar or almost similar shape as the shape of the deoxidizer and that the shape and dimensions thereof are larger than those of the deoxidizer in such a manner that the complete circumference of the substrate and the covering material goes beyond that of the deoxidizer by several mm to about 10 mm.

Moreover, in the deoxidizing sheet of the present invention, it is preferable that an adhesive layer is laminated on at least a part of the surface to be exposed to the air of either the substrate and the covering material at any point in the time interval until the deoxidizing sheet is placed in an air-tight bag.

No particular limitations are imposed on the above-mentioned adhesive layer. Specifically, examples of the adhesive layer include a layer formed of an adhesive agent.

Examples of the adhesive agent which forms the adhesive layer include a solvent type adhesive, an emulsion adhesive and a hot-melt adhesive. Any of these can be used as the adhesive agent.

Also included in the examples are a rubber adhesive, a polyvinyl acetate adhesive, an ethylene-polyvinyl acetate adhesive, a polyvinyl alcohol adhesive, a polyvinyl acetal adhesive, a poly(vinyl chloride) adhesive, an acrylic adhesive, a polyamide adhesive, a polyethylene adhesive, a cellulose adhesive, a polysulfide adhesive, and an adhesive including a hot-melt type high molecular substance.

Specifically, examples of the hot-melt type high molecular substance include an A-B-A type block copolymer, a saturated polyester type high molecular substance, a polyamide type high molecular substance, an acrylic high molecular substance, an urethane type high molecular substance, and a polyolefin type high molecular substance or a polyolefin type copolymer, or modifications thereof. These can be used either alone or in combination of two or more.

The term, modification, refers to those which are obtained by replacing a part of the components of the hot-melt type high molecular substance so as to improve the adhesion or the stability of the hot-melt type high molecular substance.

Although no particular limitations are imposed on a thickness of the adhesive layer, it is preferable to have a thickness of about 5–1,000 $\mu$m, or preferably about 10–500 $\mu$m, or more preferably about 15–250 $\mu$m. If a thickness of the adhesive layer is less than 5 $\mu$m, then desired adhesive strength is hardly obtained. On the other hand, if the thickness exceeds 1,000 $\mu$m, it becomes impractical, resulting in an oxidizing sheet which is too thick and too expensive.

In the deoxidizing sheet of the present invention, when forming the adhesive layer on a portion of the pouch which is exposed to the air, it is preferable that the exposed surface of the substrate or the covering material is processed so as to make the surface rough or that the substrate or the covering material is made of a film or a sheet which has a rough surface. Examples of such film or sheet include paper, thick paper such as cardboard and corrugating medium thereof, woven fabric or unwoven fabric such as rayon unwoven fabric, and a foamed film. This enhances the adhesion strength between the adhesive layer and the substrate or the covering material.

In the deoxidizing sheet of the present invention, other ingredients can be mixed in the above-mentioned adhesive layer where appropriate. Examples of such ingredients include other adhesive agents, an adhesion imparting agent, an anti-aging agent, a filler, an adhesion adjuster, an adhesion improving agent, a colorant, a defoamer, a tackifier, a modifying agent, a mildewcide, an anti-fungus agent, a germicide, a deodorant, etc.

Next, a first method for producing the deoxidizing sheet of the present invention will be described. The same terms as those used in the above description are to have the same meaning.

The first method includes the step of producing the viscous liquid deoxidizer of the present invention. This will be referred to as step A.

Examples of the viscous liquid deoxidizer include those which are described above.

The viscous liquid deoxidizer can be produced as follows. First, the aforementioned solid ingredients are put into a mixer, where they are uniformly mixed. Then, water or aqueous solution or dispersion solution of metal chloride is added thereto. Alternatively, all ingredients, including water or the aqueous solution or the dispersion solution of metal chloride, are put in the mixer together to be mixed uniformly.

In this case, it is preferable to add water or the aqueous solution or the dispersion solution of metal chloride after the above-mentioned solid ingredients are put in the mixer and uniformly mixed because the quality of deoxidizer to be obtained in this manner is more stable.

No particular limitations are imposed on the mixer used in the first method of the present invention as long as it is capable of uniformly mixing the ingredients for the deoxidizer. Specifically, examples of the mixer include a ribon mixer, a spartan mixer, a screw blender, a roll mixer, Banbury mixer, and a kneader.

When water content in the deoxidizer exists in excess, then no particular limitations are imposed on the mixer. When water content in the deoxidizer exists in a relatively small amount, it is preferable to mix the ingredients so as to knead them by using a mixer or a kneader. In this manner, a deoxidizer which is uniformly mixed and has high viscosity can easily be obtained.

Next, the deoxidizer obtained in step A is laminated on at least one predetermined region of the surface of a film-like or sheet-like substrate. This is called step B.

The substrate used in step B is the same as that previously described when the deoxidizing sheet was mentioned. In order to avoid repetition, the description thereof is omitted here.

In step B, where the deoxidizer is laminated on the surface of the substrate, the deoxidizer can be laminated on one region or on a plurality of regions of the surface of the substrate along the lateral direction, or it can be laminated in a shape which staggers along in the longitudinal direction.

No particular limitations are imposed on a method for laminating the deoxidizer of the present invention onto the substrate. Specifically, examples of such methods include printing such as gravure roll and screen printing, and painting or coating using a coater such as a head coater, a roller, an applicator, etc.

Next, a film-like or sheet-like covering material is placed so as to cover the deoxidizer. This is called step C.

The covering material used in step C is the same as that previously described when the deoxidizing sheet was mentioned. In order to avoid repetition, the description thereof is omitted here.

In step C, the substrate and the covering material are joined with the deoxidizer inserted therebetween. In doing so, since the deoxidizer is in the form of a viscous liquid, the deoxidizer serves as an adhesive agent. Therefore, it is not necessarily required to seal the substrate and the covering material along the periphery of the deoxidizer. However, in order to improve the quality and reliability of the product, it is preferable to seal the substrate and the covering material along the periphery of the deoxidizer by adhesion, thermal adhesion, or thermal fusion.

Since the oxidizing sheet which causes deoxidization reaction upon contact with the air is obtained in the first method, if the deoxidizer is completely sealed along the entire circumference by adhesion, thermal adhesion or thermal fusion, then it is necessary that either the substrate or the covering material or at least a part thereof is gas-permeable.

In a case where the deoxidizing sheet is to be used as a deoxidizing device for food, if it is necessary to keep the food from moisture, then it is preferable that, after the deoxidizer is laminated on the substrate, the deoxidizer is dried. Then, the covering material is placed thereon, and the substrate and the covering material are sealed along the periphery by adhesion, thermal adhesion, or thermal fusion.

No particular limitations are imposed on the drying method. Specifically, examples of the drying methods include heat drying, low-temperature drying, freeze drying and any combination of the above. Harm can be avoided not only when the drying is performed in the absence of oxygen but also when the oxygen is present if drying in a low-oxygen environment, a low-temperature drying or a rapid drying is performed.

Since the deoxidizer is made in the form of a viscous liquid in the first method of the present invention, the aforementioned merits result.

Next, a second method for forming a deoxidizing sheet will be described in detail.

In the second method, the aforementioned deoxidizer of the present invention is laminated on a film-like or sheet-like substrate, and then a film-like or sheet-like covering material is placed thereon. The substrate and the covering material are joined due to the viscosity of the deoxidizer, thereby obtaining a laminate.

Since, also in the second method of the present invention, the deoxidizer is made in the form of a viscous liquid, the aforementioned merits result.

In the second method, no particular limitations are imposed on a method for laminating the deoxidizer on the substrate. Specifically, the above-described methods can be used.

When the deoxidizing sheet is to be used as a deoxidizing device for food, if it is necessary to keep the food from moisture, then it is preferable that, after the deoxidizer is laminated on the substrate. Then, the deoxidizer is dried, and the covering material is placed thereon.

No particular limitations are imposed on the drying method. Specifically, the similar methods described in the first method can be used.

Examples of the substrate and the covering material to be used in the second method of the present invention include those which are used in the production of the deoxidizing sheet of the present invention. In order to avoid repetition, the description thereof is omitted here.

In the second method of the present invention, the laminate thus obtained is blanked into a predetermined shape. Moreover, at least a portion of a pouch made of the aforementioned substrate and covering material is gas-permeable.

The step of blanking the above-described laminate can be performed while the laminate is held motionless. In this case, if a plurality of laminates which are arranged both in the feed direction and in the lateral direction perpendicular thereto are blanked simultaneously, then a large number of deoxidizing sheet of the present invention can be formed in one step, thereby realizing low cost production.

In the second method of the present invention, in order to simplify production steps and to shorten production time, it is preferable to feed the laminate at the same rate of speed as during the production and to blank the laminate into a predetermined shape by using a roll press, thereby obtaining the deoxidizing sheet of the present invention.

As described above, if a roll press is used, then successive blanking of the laminate can be performed, and the production of the laminate and the blanking can be performed as successive steps. Therefore, a large number of deoxidizing sheets of the present invention can be produced in a short period of time. This greatly cuts down the production cost compared to a method where the laminate has to be held motionless for blanking.

Moreover, in the above case, by arranging the laminates in the lateral direction perpendicular to the feed direction of the laminate and successively blanking, or by arranging the laminates both in the feed direction and in the lateral direction and successively blanking in a staggering manner, the production cost can further be cut down.

In the step of blanking, the shape into which the laminate is blanked can be arbitrarily determined, depending on the shape of the food container such as a bag.

In the second method of the present invention, the substrate and the covering material are put together by the viscosity of the deoxidizer of the present invention, and then excess water content is absorbed by the substrate and the covering material. Moreover, the deoxidizing sheet of the present invention is placed and sealed in a non-gas-permeable outer bag and is put to distribution in the market. As a result, the oxidizing sheet can be sold as a commodity by itself.

However, it is preferable that the blanked deoxidizing sheet of the present invention is placed between a pair of films or sheets and, at the same time as or after the oxidizing sheet is placed between the films or sheets, the pair of films or sheets are blanked into a shape larger than the deoxidizing sheet. The pair of films or sheets are then put together and sealed by adhesion, thermal adhesion or thermal fusion along the periphery of the deoxidizing sheet at the same time as or after the blanking of the pair of films or sheets.

In this case, the pouch material, namely the pair of films or sheets, for the deoxidizing sheet is configured such that the sides thereof or at least an entire or partial area of the surface thereof on either the substrate side or on the covering material side is gas-permeable, thereby obtaining a more reliable deoxidizing sheet.

That is, the deoxidizing sheet of the present invention having a predetermined shape can be obtained in the above-described step, and in order for the air to be supplied to the deoxidizer inside, at least a portion of the deoxidizing sheet is gas-permeable.

Examples of the above-described films or sheets include those which are gas-permeable and those which are not. The pair of films or sheet can both be gas-permeable. Moreover, these films or sheets can have adhesive property, thermal adhesive property or thermal fusion property.

Examples of the above-described films or sheets having adhesive property include those having a base film or a base sheet on which either a gas-permeable adhesive layer is formed of a hot melt type adhesive on the entire surface thereof or a gas-permeable or non-gas-permeable adhesive layer is partly formed on the surface thereof. It is of no interest whether the base film or the base sheet itself has the thermal adhesive property or the thermal fusion property.

In the second method of the present invention, the deoxidizing sheet of the present invention is placed between these two films or sheets, and at the same time as or after the deoxidizing sheet is placed, the two films or sheets are blanked into a shape which is larger than the deoxidizing sheet. Then, the two films or sheets are put together and sealed along the periphery of the deoxidizing sheet at the same time as or after the blanking is performed. As in the case of the above-described deoxidizing sheet, this sealing can be partly performed.

In the step of blanking into a shape which is larger than the deoxidizing sheet, no particular limitations are imposed as long as the shape is larger than the deoxidizing sheet. However, it is preferable that the shape is similar or almost similar to the shape of the deoxidizing sheet and that the shape is larger and extends beyond the shape of the deoxidizing sheet by several mm on the entire circumference.

In the second method of the present invention, the aforementioned two films or sheets are joined and sealed by adhesion, thermal adhesion or thermal fusion on the extending region, i.e., along the periphery of the deoxidizing sheet.

In the second method of the present invention, it is preferable that the deoxidizing sheet has the adhesive layer on one of the exposed surfaces either entirely or partly as in the case of the deoxidizing sheet of the present invention previously described.

EXAMPLES

Hereinafter, examples of the present invention will be described with reference to the attached drawings. It should be understood, however, that the present invention is not limited to these examples.

The examples of the present invention will describe a method for producing a deoxidizing sheet to be placed inside a food container and the deoxidizing sheet produced by this method.

Example 1

Figure 2:
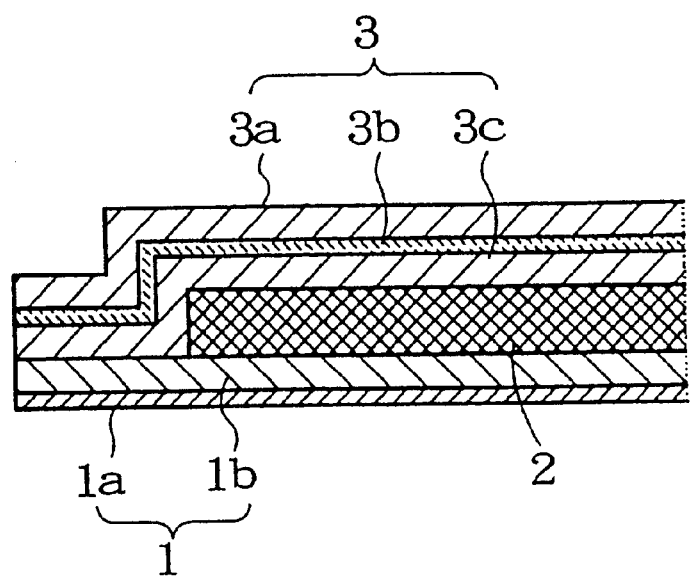
FIG. 2 is a cross-sectional view of the deoxidizing sheet according to the present invention.

FIG. 1 is a plan view and FIG. 2 is a cross-sectional view, both illustrating the deoxidizing sheet of the present invention. This deoxidizing sheet includes a substrate 1 having a water absorptive property, and a viscous liquid deoxidizer 2 of a circular shape having a thickness of 600 μm and a diameter of 50 mm disposed on the substrate 1 by screen printing. An adhesive agent is applied on the periphery of the deoxidizer 2, and a covering material 3 is introduced and laminated thereonto by a roller, thereby interposing the deoxidizer 2 between the substrate 1 and the covering material 3. Then, the deoxidizing sheet thus obtained is blanked by a press machine around a circumference extending beyond the deoxidizer 2 by about 5 mm, or in other words, into a circular shape of a diameter of 60 mm.

As shown in the cross-sectional view of FIG. 2, the substrate 1 includes a cardboard K liner 1b (NS liner manufactured by Nihon Shigyo, basis weight: 180 g/m², water absorptiveness: 54 g/m²) and a polyethylene film 1a of about 30 μm thickness having a non-gas-permeability. The cardboard K liner 1b and the polyethylene film 1a are laminated, and the deoxidizer 2 is printed on the cardboard K liner 1b side of the substrate 1 so that the deoxidizer 2 and the cardboard K liner 1b make direct contact.

Moreover, in this example, the covering material 3 includes an unwoven fabric made from polyethylene terephthalate 3a (7830 manufactured by Shinwasha, basis weight: 30 g/m²) as an outer layer, a porous film 3b (pouramu manufactured by Tokusousha, moisture permeability: 500 g/m²hr, thickness: 50 μm), and a rayon unwoven fabric 3c (7180 manufactured by. Shinwasha, basis weight: 80 g/m², water absorptiveness: 60 g/m²) as an inner layer, which are laminated with an adhesive formed by melt-blowing (5Q543 manufactured by NSC) and applied between these layers. The basic weights of this adhesive are about 5 g/m² between the unwoven fabric 3a and the porous film 3b, and about 5 g/m² between the porous film 3b and the rayon unwoven fabric 3c.

The aforementioned deoxidizer is produced in the following method.

To 100 parts by weight of iron powder (DKP manufactured by Douwa Teppun) as a reactive component, 0.21 parts by weight of a water absorptive polymer (Sanfuresshu ST-500MPS® manufactured by Sanyo Kasei), 1.4 parts by weight of a thixotropic agent (Celogen EP® manufactured by Daiichi Kogyo Seiyaku), 4.21 parts by weight of active carbon (SA-SUPER manufactured by Noritto), 4.87 parts by weight of sodium chloride as a metal chloride, and 0.25 parts by weight of sodium tripolyphosphate as a pH adjuster are mixed. Then, excess water is added to this mixture so that the viscosity becomes about 3,000,000 cps at a temperature of 20° C.

That is, the active carbon, the tackifier, the water absorptive polymer, the pH adjuster, sodium chloride and metal powder are introduced into a mixer (T. K. Hybismix 2P-100 manufactured by Tokushu Kika Kogyo K. K., volume: 100 liters) in this order with the above-described mixing ratios and stirred for 3 minutes. Then, while further stirring, water is added and the mixture is kneaded for 10 minutes.

Then, the inside of the mixer including the blade is cleaned for any residue of the mixture, and the kneading is performed for another 10 minutes, after which measurements for viscosity and specific weight are made. The adjustment for water content is made in such a manner that the viscosity measured in a method to be described below becomes about 3,000,000 cps. The water content was 29.79 parts by weight with respect to 100 parts by weight of iron powder (DKP manufactured by Douwa Teppun). The obtained deoxidizer had a viscosity of 3,030,000 cps and a specific weight of 2.90 g/cc.

The blade was rotated at about 10 rpm from the start to the end.

The viscosity of the obtained deoxidizer increased if it was kept stored for one hour at a temperature of 10° C. However, if the deoxidizer was stirred again for 10 minutes at 10 rpm, the viscosity recovered to 3,050,000 cps.

The viscosity was measured by a device manufactured by Toki Sangyo (R110 type viscometer, RE110U system, detection head RE100U, controller RC100A). An SPP rotor was used, the rate of revolution was 0.2 rpm (D=0.4 (1/S)), and the measurement temperature was 20° C.

The viscosity of the deoxidizer of the present invention is preferably in the range of about 1,000–8,500,000 cps. The viscosity here refers to a value when lamination and printing are performed.

Therefore, the deoxidizer 2 of the present invention is in the form of viscous liquid and has a small surface area, resulting in a limited contact area with the air. Moreover, a gel containing an excess water content or free water and water content inhibit contact between the iron powder and the air. This results in a considerable limitation on an extent of oxidation per unit time. And since the film-like or sheet-like covering material is laminated thereon, the oxidation reaction until the time when the deoxidizing sheet of the present invention is obtained is almost inhibited.

In the present invention, if the viscous liquid deoxidizer is produced with an increased mixing ratio of water content, then the excess water content functions as a barrier layer, and the air supply to the metal powder is further reduced. As a result, a loss of deoxidizing capability of the deoxidizer due to the undesired oxidation reaction during production, and various difficulties associated with a decrease in the quality of the deoxidizing sheet and with the coagulation of the deoxidizer can be prevented. Therefore, more stable quality and considerably high reliability are achieved.

If the deoxidizer 2 of the present invention is printed on the substrate in such a manner that the thickness of the deoxidizer 2 becomes 600 μm, then a part of water content of the deoxidizer begins to be absorbed by the water absorptive cardboard K liner 1b of the substrate. After the covering material 3 is placed, the water content is absorbed by the rayon unwoven fabric 3c of the covering material 3. The deoxidizer 2 then becomes porous and the contact with the air becomes excellent, and the deoxidization reaction readily proceeds upon contact with the air.

However, it takes substantially long periods of time for a part of the water content within the deoxidizer to be absorbed by the substrate 1 and the covering material 3, thereby achieving an excellent contact with the air. On the other hand, it takes a extremely short period of time for the deoxidizer 2 to be placed on the substrate 1 by screen printing and then placed and sealed in a non-gas-permeable bag.

Therefore, the deoxidizer 2 hardly undergoes oxidation reaction during a period of time until the deoxidizing sheet is placed and sealed in the non-gas-permeable bag. Hence, there do not possibly arise difficulties associated with various deleterious effects resulting from coagulation of reaction products, such as a decrease in yield, difficulty in handling, complication of production machine maintenance, limitations on operating hours of the production facilities and on working hours of workers, difficulties in processing coagulants, or the like By the time the deoxidizing sheet is sealed in a non-gas-permeable bag and distributed to the end user, a part of the water content of the deoxidizing sheet 2 is absorbed both in the water absorptive cardboard K liner 1b and the rayon unwoven fabric 3c of the covering material 3, and the optimum condition for the required deoxidization reaction is achieved. Therefore, the quality of the deoxidizer 2 will not have deteriorated by the time when the non-gas-permeable bag is opened and the deoxidizing sheet is placed inside the food container. The quality of the deoxidizer 2 can be maintained at high level, and the deoxidization reaction which absorbs oxygen in the air can be started at the time when the deoxidizing sheet is placed inside the food container.

Example 2

The deoxidizing sheet of the present invention was obtained in a similar manner as in Example 1 except for the following. The viscous liquid deoxidizer 2 was placed on the substrate 1 by screen printing in a circular shape of about 60 μm thickness and of about 50 mm diameter. Then, right after induction heating (the temperature in the range of 90–100° C.), the deoxidizing sheet was dried in a vacuum (pressure of 4–10 torrs) for about 6 minutes.

The deoxidizing sheets according to Examples 1 and 2 were placed and sealed in non-gas-permeable bags. Then, after being left for 10 days, the non-gas-permeable bags were opened. The deoxidizing sheet was taken out and placed in a desiccator having a volume of 1,000 ml. The deoxidization test was conducted as follows.

As a sampling set-up for oxygen analysis, a sampling device PC-110 manufactured by Toray Engineering K. K. (equipped functions include suction of subject gas, flow rate control and filtering capability) and an oxygen meter LC-750H (an oxygen meter for high concentration using fixed zirconium battery) were used. Air in the desiccator was circulated at the rate of 200 ml/min, and the temperature and the humidity were 22±1° C. and 60–72%, respectively.

In the above setting, the oxygen concentration within the desiccator was measured after 24 hours, and it was confirmed that the concentration was less than 0.05% for both deoxidizing sheets of Examples 1 and 2, indicating an excellent deoxidizing effect.

As a comparison, a powdery deoxidizer was used. This powdery deoxidizer was prepared by mixing, with respect to 100 parts by weight of iron powder (DKP manufactured by Dowa Toppun), 20 parts by weight of active carbon (SA-SUPER manufactured by Norrito), 4.87 parts by weight of sodium chloride, 0. 25 parts by weight of sodium tripolyphosphate as a ptH adjuster and 25 parts by weight of water.

In order to obtain a deoxidizing device with the powdery deoxidizer, 10 g of this powdery deoxidizer was placed in a pouch so that a deoxidizing device was formed. The pouch was made of a polyethylene film (non-gas-permeable) of about 30 μm thickness forming one side of the pouch and a porous film (pouramu manufactured by Tokusousha, humidity permeability: 500 g/m²hr, thickness: 50 μm) forming the other side of the pouch. The obtained deoxidizing pouch was placed in a nongas-permeable bag and left for ten days. Then, the non-gas-permeable bag was opened to take the deoxidizing pouch out, which was then placed in the 1,000 ml desiccator for deoxidization test conducted in the same manner as described above.

The oxygen concentration within the desiccator was measured after 24 hours in the above-described manner. It was confirmed that the oxygen concentration was 0.1–0.085%

Moreover, when the deoxidizing sheet of the present invention was left in the air at a temperature of 25° C. and a humidity of 85% for 30 minutes, no change was observed on the surface. However, the powdery deoxidizer in the pouch used for comparison showed small color change to brown after 15 minutes under the same condition, and after 30 minutes, coagulation was partly observed.

From the above results, it was confirmed that the viscous liquid deoxidizer of the present invention was more stable than the powdery deoxidizer used for comparison.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United States is:

1. A viscous liquid deoxidizer comprising a mixture including about 100 parts by weight of a metal powder,
   a reactive component including about 0.21 parts by weight of a water absorptive
   about 4.21 parts by weight of an active carbon
   from about 0.5 to about 15% by weight of a metal chloride
   about 0.25 parts by weight of a pH adjuster, and
   sufficient water is added so that a viscosity of the mixture becomes from about 1000 to about 8,500,000 cps at a temperature of 20° C.

2. A viscous liquid deoxidizer as set forth in claim 1, in which said metal power is selected from the group consisting of iron, zinc, aluminum or magnesium.

3. A viscous liquid deoxidizer as set forth in claim 2 which includes calcium hydroxide or magnesium hydroxide or a mixture of the same.

4. A viscous liquid deoxidizer as defined in claim 1, further comprising an oxygen absorbent.

5. A viscous liquid deoxidizer as defined in claim 4, wherein said oxygen absorbent is selected from the group consisting of sodium chondroitin sulfate, thiamine hydrochloride, ascorbic acid, dibutylhydroxytoluene, dl-α-tocopherol, reducing sugar, ferrous salt, ferrosilicon, silicon manganese or calcium silicide.

* * * * *